(12) United States Patent
Vandeventer et al.

(10) Patent No.: US 12,056,001 B2
(45) Date of Patent: Aug. 6, 2024

(54) APPARATUS AND METHOD FOR IDENTIFYING SINGLE POINTS OF FAILURE

(71) Applicant: Second Sight Data Discovery, Inc., Bloomington, IN (US)

(72) Inventors: Reuben Vandeventer, Bloomington, IN (US); David Imrem, Bloomington, IN (US)

( * ) Notice: Subject to any disclaimer, the term of this patent is extended or adjusted under 35 U.S.C. 154(b) by 0 days.

(21) Appl. No.: 18/073,250

(22) Filed: Dec. 1, 2022

(65) Prior Publication Data

US 2024/0184659 A1  Jun. 6, 2024

(51) Int. Cl.
*G06F 11/00* (2006.01)
*G06F 8/71* (2018.01)
*G06F 11/07* (2006.01)

(52) U.S. Cl.
CPC ............ *G06F 11/079* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 9,930,061 B2 | 3/2018 | Zandani | |
| 10,491,619 B2 | 11/2019 | Yampolskiy | |
| 11,140,193 B2 | 10/2021 | Patel | |
| 11,157,629 B2 | 10/2021 | Shenoy | |
| 2020/0089848 A1 | 3/2020 | Abdelaziz | |
| 2020/0310899 A1* | 10/2020 | Kelam | G06F 11/0784 |
| 2020/0409825 A1* | 12/2020 | Balasubramanian | G06F 11/302 |
| 2021/0026756 A1* | 1/2021 | Magnezi | G06F 11/3664 |
| 2021/0157693 A1* | 5/2021 | Waters | G06F 11/2028 |
| 2021/0303422 A1* | 9/2021 | Dye | G06F 11/2028 |

OTHER PUBLICATIONS

Google Scholar/Patents search—text refined (Year: 2023).*
Google Scholar/Patents search—text refined (Year: 2024).*

* cited by examiner

*Primary Examiner* — Christopher S McCarthy
(74) *Attorney, Agent, or Firm* — Caldwell Intellectual Property Law

(57) ABSTRACT

An apparatus and method for identifying single points of failure are described. The apparatus includes at least a processor and a memory communicatively coupled to the at least a processor. The memory includes instructions configuring the at least a processor to receive digital resource data for a plurality of digital resources linked to a computing environment, generate a plurality of dependency trees for the plurality of digital resources, determine at least one common digital resource from each of the plurality of dependency trees, and identify a single point of failure from the at least one common digital resource.

18 Claims, 7 Drawing Sheets

APPARATUS AND METHOD FOR IDENTIFYING SINGLE POINTS OF FAILURE

FIELD OF THE INVENTION

The present invention generally relates to the field of cyber security. In particular, the present invention is directed to an apparatus and method for identifying single points of failure.

BACKGROUND

In recent years, cyber security has become increasingly important as much of the world's information is stored digitally. Modern cyber security solutions have to account many computing devices and programs. However, it may be difficult to pinpoint a single computing device and/or program as a potential cause of system failure.

SUMMARY OF THE DISCLOSURE

In an aspect, an apparatus for identifying single points of failure is provided. The apparatus includes at least a processor and a memory communicatively coupled to the at least a processor. The memory includes instructions configuring the at least a processor to receive digital resource data for a plurality of digital resources linked to at least a computing environment, generate a plurality of dependency trees for the plurality of digital resources, determine at least one common digital resource from each of the plurality of dependency trees, and identify a single point of failure from the at least one common digital resource.

In another aspect, a method for identifying single points of failure is provided. The apparatus includes at least a processor and a memory communicatively coupled to the at least a processor. The memory includes instructions configuring the at least a processor to receive digital resource data for a plurality of digital resources linked to at least a computing environment, generate a plurality of dependency trees for the plurality of digital resources, determine at least one common digital resource from each of the plurality of dependency trees, and identify a single point of failure from the at least one common digital resource.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for identifying single points of failure. In various embodiments, at least a processor is configured to identify at least one single point of failure. Aspects of the current disclosure allow for efficient and accurate identification of individual points of failure.

Exemplary embodiments illustrating aspects of the present disclosure are described below in the context of several specific examples.

Figure 1:
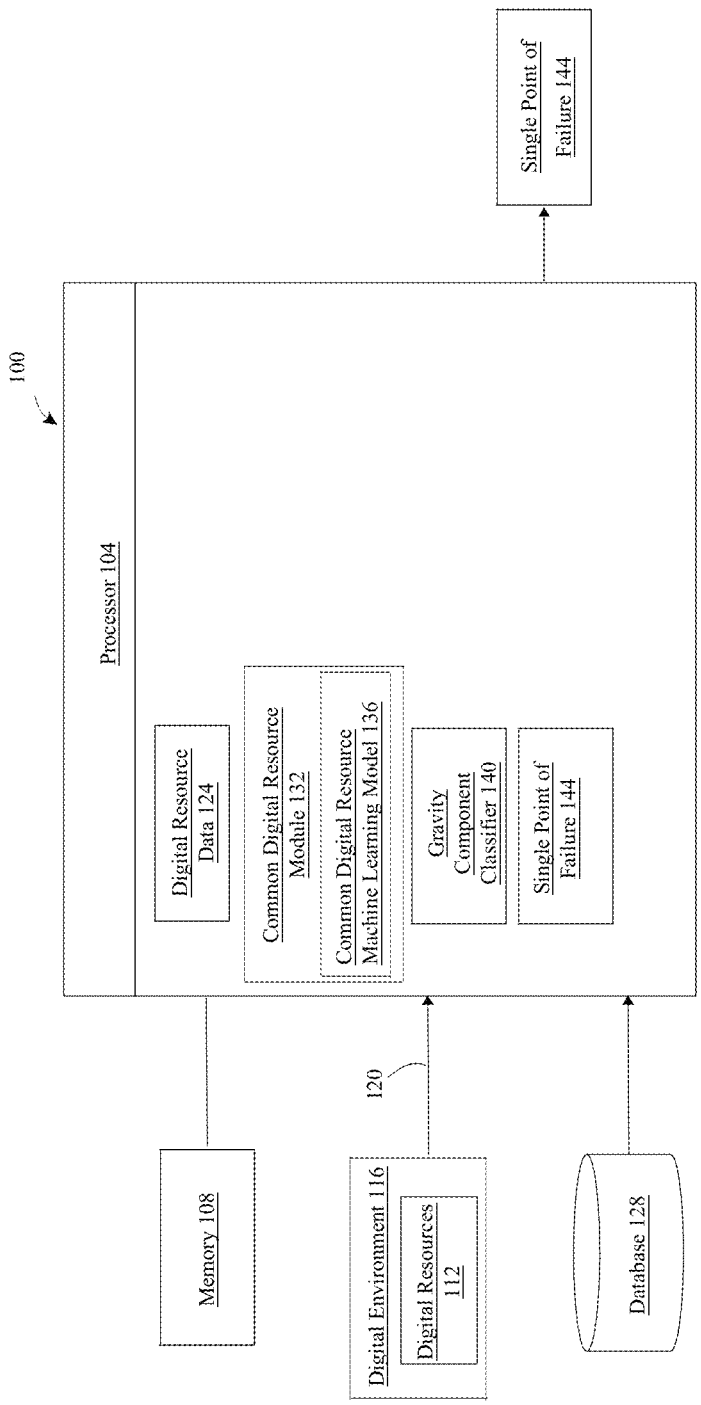
FIG. 1 is a block diagram of an apparatus for identifying single points of failure.

Referring now to FIG. 1, an exemplary embodiment of an apparatus 100 for identifying single points of failure is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, Processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 104 may further comprise and/or be included in a server. A server may include a computing device and/or a plurality of computing devices that provides functionality for other programs or devices. A server may provide various functionalities such as sharing data or resources and performing computation among multiple other programs and or devices. Servers may include database servers, file servers, mail servers, print servers, web servers, and/or application servers. In an embodiment, the server may communicate with a computing environment through a communication network. A communication network may include a network interface card (e.g., a mobile network interface card, a LAN card), a modem, and any combination thereof. A communication network may also include a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof. A communication network may employ a wired and/or wireless mode of communication. In general, any network topology may be used. Information may be communicated to and/or from digital wallet through a communication network. In a non-limiting example, processor 104 may include security protections against software or software and hardware attacks, including without limitation attack scenarios in which a malicious actor may attempt to extract cryptographic keys for purpose of spoofing the key, the modify computer code, data or memory structures or similar; such protections may include, without limitation, a secure computing module or elements thereof as disclosed in further detail below. Processor 104 may also include public/private key pairs or other cryptographic key pairs, including without limitation symmetric public keys, elliptic curve based, keys, asymmetric public keys, and the like, or mechanisms to create them, for purposes of cryptographically authenticating the validity of processor 104 to another device, authenticating the validity of secure software loaded onto the device, or other data, including without limitation inputs, outputs, time of loading, and/or time of execution of software, boot sessions, or the like.

With continued reference to FIG. 1, processor 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a processor 104/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

Continuing to reference to FIG. 1, a computing device and/or apparatus 100 may also include a memory 108. Memory 108 may include any memory as described in this disclosure. Memory 108 may be communicatively connected to processor 104. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Memory 108 may be configured to provide instructions to processor 104, which may include any processor as described in this disclosure.

Still referencing FIG. 1, processor 104 is configured to receive digital resource data about a plurality of digital resources 112. As used in this disclosure, a "digital resource" is any hardware and software that makes up a computer system and/or computing environment 116 as well as any software or device that can be accessed from that computer system and/or computing environment. "Digital resource data," as used in this disclosure is any data and/or information about digital resources.

With continued reference to FIG. 1, as used in this disclosure, "computing environment" is an integrated communications environment where digital devices communicate and manage data and interactions within the computing environment. Digital device may be any computing device as described in this disclosure, for example as described in FIG. 7. For example, computing environment 116 may be one of a computer system, computer network, and the like. In an exemplary embodiment, computing environment 116 may include a plurality of user devices operating plurality of software applications. A "user device," for the purpose of this disclosure, is any additional computing device, such as a mobile device, laptop, desktop computer, or the like. In a non-limiting embodiment, user device may be a computer and/or smart phone operated by a user in a remote location. User device may include, without limitation, a display; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, user device may include a graphical user interface (GUI) configured to display any information from apparatus 100 and/or any computing device. In some embodiments, computing environment 116 may also include any electronically based asset communicatively connected and/or otherwise connected and/or linked with computing environment 116, as described in more detail below. For example, electronically based digital assets may be computer programs, data, data stores, and the like, but are not limited to such examples. The computing environment 116 may be connected to processor 104 by a network 120, as described in more detail above. Plurality of digital resources may be linked to a computing environment where the plurality of digital resources operates, executes, or is stored in the computing environment. In an embodiment, plurality of digital resources may be linked to two or more computing environments; single points of failure as described in this disclosure may include a digital resource used in two or more computing environments, such as two or more computing environments within an organization, or two or more computing environments that are within different organizations.

Continuing to reference FIG. 1, in an embodiment, digital resource 112 may be a user device, a data processing computing program operating on a computing device, and the like. Each digital resource may be connected by a communication network. The communication network may include a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof. A communication network may employ a wired and/or wireless mode of communication. Further, the computing environment 116 may employ any type of network architecture. For example, the computing environment 116 may employ a peer to peer (P2P) architecture where each computing device in a computing network is connected with every computing device in the network and every computing device acts as a server for the data stored in the computing device. In a further exemplary embodiment, the computing environment 116 may also employ a client server architecture where a computing device is implemented as a central computing device (e.g., server) that is connected to each client computing device and communication is routed through the central computing device. However, the network architecture is not limited thereto. One skilled in the art will recognize the various network architectures that may be employed by the computing environment. Further, any network topology may be used. For example, the computing environment 116 may employ a mesh topology where a computing device is connected to one or multiple other computing devices using point to point connections. However, the network topology is not limited thereto. One skilled in the art will recognize the various network architectures that may be employed by the computing environment.

Still referring to FIG. 1, as described above, digital resource data 124 is any data and/or information about digital resources 112. For example, digital resource data 124 may include frequency of use data for digital resources, users associated with the digital resource, dependency on other digital resources, and the like. In an embodiment, digital resource data 124 may be obtained from a database, such as database 128. Database 128 may be implemented, without limitation, as a relational database, a key-value retrieval database such as a NOSQL database, or any other format or structure for use as a database that a person skilled in the art would recognize as suitable upon review of the entirety of this disclosure. Database 128 may alternatively or additionally be implemented using a distributed data storage protocol and/or data structure, such as a distributed hash table or the like. Database 128 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in an embodiment, digital resource data 124 may include product level data associated with the plurality of digital resources 112. As used in this disclosure, "product level data" is any data and/or information about individual digital resources. In a non-limiting example, product level data may include digital resource data 124 about individual software applications, computing devices, relationship data between a digital resource and other digital resources, and the like. Further, additionally, or alternatively, processor 104 may be configured to determine product version data as a function of the product level data and identify a product version of each of the plurality of digital resources. "Product version," as used in this disclosure, is a specific unique state of development for digital resources with differing features and/or functionalities than other unique states. As used in this disclosure, "product version data" is data associated with a specific unique state of a plurality of unique states for digital resources. In a non-limiting example, a software application may have a first version, a second version, and a third version of the software application. Each of the first version, second version, and third version may have unique product version data that may be used to identify each version of the software application. Further, processor 104 may be configured to identify which version(s) of the software application is/are being utilized in the computing environment. For example, processor 104 may be configured to use the unique product version data and determine the version of a digital resource being utilized.

Continuing to refer to FIG. 1, digital resource data 124 may include component level data associated with the plurality of digital resources 112. As used in this disclosure, "component level data" is any data and/or information about individual components of digital resources. In a non-limiting example, component level data may include digital resource data 124 about individual parts of software applications, computing devices, relationship data between components, and the like. Further, additionally, or alternatively, processor 104 may be configured to determine component version data as a function of the component level data and identify a component version of each component of the plurality of digital resources. "Component version," as used in this disclosure, is a specific unique state of development for components of digital resources with differing features and/or functionalities than other unique states. As used in this disclosure, "component version data" is data associated with a specific unique state of a plurality of unique states for components of digital resources. In a non-limiting example, a security protocol may have a first version, a second version, a third version, and a fourth version of the security protocol. Each of the first version, second version, and third version may have unique product version data that may be used to identify each version of the security protocol. Further, processor 104 may be configured to identify which version(s) of the security protocol is/are being utilized in the computing environment.

Still referring to FIG. 1, processor 104 may be configured to generate a plurality of dependency trees for the plurality of digital resources 112. As used in this disclosure, a "dependency tree" is a data structure that describes dependencies of digital resources to other digital resources within a computing environment. Further, a "dependency tree," is an acyclic graph with components of manifest file as nodes and relations as edges. In an embodiment, dependency tree may include a plurality of nodes, wherein each node of plurality of nodes may include a digital resource. In other embodiments, dependency tree may include one or more nodes, wherein each node may include a first digital resource incorporated into a second digital resource, wherein the second digital resource is a later version of the first digital resource. In some cases, nodes of dependency tree may further include digital resources 112 such as APIs, libraries, licenses, and the like thereof. In some embodiments, nodes may include direct dependencies, and may be parent nodes in which child nodes include transitive dependencies. In other embodiments, dependency tree may include a dependency sub-tree. As used in this disclosure, a dependency sub-tree is a dependency tree which is a child of a node in dependency tree. Further, dependency tree may be a graph. For example, a dependency tree for a software application may describes dependencies on a computing device, a security application, other software applications that may input data and/or receive output data, and the like. In an embodiment, processor 104 may be configured to generate a dependency tree for each digital resource of the plurality of digital resources. Each dependency tree may be configured to describe a digital resource's dependency on other digital resources.

Continuing to refer to FIG. 1, processor 104 may be configured to generate a user interface data structure configured to display the plurality of dependency trees. As used in this disclosure, "user interface data structure" is a specialized formatting of data on a computer so that the information can be organized, processed, stored, and retrieved quickly and effectively for a user interface. The user interface data structure may allow the plurality of dependency trees to be displayed on a display, graphical user interface, and the like. Display device may include, but is not limited to, a smartphone, tablet, laptop, monitor, tablet, and the like. Display device may include a separate device that includes a transparent screen configured to display computer generated images and/or information. The plurality of dependency trees may be reviewed by a user, network administrator for the computing environment, and any other decisionmakers for the computing environment to gather information about the dependencies of digital resources implemented within for the computing environment 116 that may need to be monitored to prevent and/or minimize the effects of a cyber-attack.

With continued reference to FIG. 1, processor 104 is configured to determine at least one common digital resource from each of the plurality of dependency trees. As used in this disclosure, a "common digital resource" is a digital resource that a plurality of digital resources is connected to and require for functioning of the plurality of digital resources. For example, the common digital resource may include a security protocol, a database, a communication application, a cloud application, and the like. In an exemplary embodiment, processor 104 may be configured to identify a digital resource of the plurality of digital resources that may be included in each of the plurality of dependency trees and determine the digital resource as a common digital resource of the at least one common digital resource. For example, each of the dependency trees for digital resources 112 in computing environment 116 may describe a dependency on a security application and processor 104 may be configured to identify the security application as at least one common digital resource based on the decision trees describing the dependency of digital resources 112 on the security application.

Continuing to reference FIG. 1, processor 104 may use a machine learning module, such as common digital resource module 132, to implement one or more algorithms or generate one or more machine-learning models, such as common digital resource learning model 132, to determine at least one common digital resource. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database, such as any database described in this disclosure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Common digital resource module 132 may be used to generate common digital resource machine learning model 136 and/or any other machine learning model, such as single point of failure machine learning model described below, using training data. Common digital resource learning model 136 may be trained by correlated inputs and outputs of training data. Training data may be data sets that have already been converted from raw data whether manually, by machine, or any other method. Training data may include previous outputs such that common digital resource machine learning model 136 iteratively produces outputs. Common digital resource machine learning model 136 using a machine-learning process may output converted data based on input of training data.

Still referring to FIG. 1, in an embodiment, determining at least one common digital resource from each of the plurality of dependency trees may include determining at least one common digital resource from each of the plurality of dependency trees using a machine learning model, such as common digital resource machine learning model 136 generated by common digital resource module 132. Common digital resource machine learning model 136 may be trained by training data, discussed in further detail below, such as common digital resource training data. Common digital resource training data may be stored in database 128.

With continued reference to FIG. 1, determining at least one common digital resource from each of the plurality of dependency trees using a machine learning model may include receiving common digital resource training data. In an embodiment, common digital resource training data may include a plurality of dependency tree data and/or digital resource data 124 that are each correlated to one of a plurality of common digital resource data. For example, common digital resource training data may be used to show dependency tree data and/or digital resource data 124 may indicate a particular digital resource that other digital resources in computing environment are dependent upon. In an exemplary embodiment, a common digital resource may be a security protocol, operating system, and the like. In a further embodiment, common digital resource training data may also include a plurality of dependency tree data and/or digital resource data 124 that are each correlated to one of a plurality of common digital resource data 124. In such an embodiment, common digital resource training data may be used show how dependency tree data and/or digital resource data 124 may indicate a particular common digital resource. Determining at least one common digital resource from each of the plurality of dependency trees using a machine learning model may further include training a common digital resource machine learning model 136 as a function of common digital resource training data. Further, determining at least one common digital resource from each of the plurality of dependency trees using a machine learning model may also include determining the at least one common digital resource using trained common digital resource machine learning model 136.

Continuing to reference FIG. 1, additionally, or alternatively, determining at least one common digital resource from each of the plurality of dependency trees may include determining at least one common version of digital resource based on the product version data. As used in this disclosure, "common version" is a specific unique state of development for digital resources that is being used a plurality of times in computing environment 116. In a non-limiting example, a software application being used by a plurality of user may have a first version, a second version, and a third version of the software application, as described above. Further, processor 104 may be configured to determine a product version of the software application being used by each of the plurality of users. Further, processor 104 may be configured to identify the digital resource and a version of the digital resource as the at least one common digital resource. For example, processor 104 may be configured to determine the third version of the software application as the at least one common digital resource.

Continuing to refer to FIG. 1, determining at least one common digital resource from each of the plurality of dependency trees may include determining a gravity component for the at least one common digital resource. As used in this disclosure, "gravity component" is a score indicating a level of dependency on the at least one common digital resource by other digital resources in computing environment. For example, processor 104 may be configured to determine a higher gravity component for a software application that includes dependencies from a greater number of other digital resources. In a further non-limiting example, processor 104 may be configured to determine a lower gravity component for a software application that includes dependencies from a lesser number of other digital resources. For example, a first common digital resource with a gravity component of "82" may be an indication there is a greater level of dependency on the first common digital resource than a second common digital resource with a gravity component of "73." In an embodiment, the gravity component may include a ranking out of five stars, out of a scale of 1-10, a percentage score, and the like. Alternatively, or additionally, the gravity component may be an alphabetic score, such as, but not limited to, "A+," "A," "A−," "B+," "B," "B−," "C+," "C," "C−," "D+," "D," "D−," "F," and the like. Further, alternatively, or additionally, a fuzzy inferencing system for determining a gravity component for the at least one common digital resource may be employed, where any or all gravity components may be represented as values and/or fuzzy sets for linguistic variables measuring the same, as described in more detail in FIG. 6. An inferencing system may use one or more fuzzy inferencing rules, as described below in FIG. 6, to output one or more linguistic variable values and/or defuzzified values indicating gravity components overall or according to categories.

Still referring to FIG. 1, in an embodiment, determining a gravity component for the at least one common digital resource may include determining a gravity component for the at least one common digital resource using a machine learning model, such as a gravity component machine learning model. Gravity component machine learning model may be trained by training data, discussed in further detail below, such as gravity component training data. Gravity component training data may be stored in database 128.

With continued reference to FIG. 1, determining a gravity component for the at least one common digital resource using a machine learning model may include receiving gravity component training data. In an embodiment, gravity component training data may include a plurality of dependency tree data and/or digital resource data 124 that are each correlated to one of a plurality of gravity component data. For example, gravity component training data may be used to show dependency tree data and/or digital resource data 124 may indicate a particular gravity component. In a further embodiment, gravity component training data may also include a plurality of dependency tree data and/or digital resource data 124 that are each correlated to one of a plurality of gravity component data. In such an embodiment, gravity component training data may be used show how dependency tree data and/or digital resource data 124 may indicate a particular gravity component. Determining a gravity component for the at least one common digital resource using a machine learning model may further include training a gravity component machine learning model as a function of gravity component training data. Further, determining a gravity component for the at least one common digital resource using a machine learning model may also include determining the gravity component for the at least one common digital resource using trained gravity component machine learning model.

Continuing to refer to FIG. 1, additionally, or alternatively, determining a gravity component for the at least one common digital resource may include generating, by the at least a processor 104, a gravity component classifier 140. Processor 104 may be configured to receive gravity component training data, such as gravity component training data as described herein. For example, gravity component training data may include a plurality of dependency tree data and/or digital resource data 124 that are each correlated to one of a plurality of gravity component data. For example, gravity component training data may be used to show how dependency tree data and/or digital resource data 124 may indicate particular gravity components. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 104 and/or another device may generate a classifier using a classification algorithm, defined as a process whereby a processor 104 derives a classifier from training data, such as user experience training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Continuing to refer to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2}$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values Gravity component classifier 140 may classify digital resource data to one or more types and/or category of gravity components. For instance, gravity component classifier 140 may receive digital resource data and may classify the digital resource data to a gravity component category. Gravity component classifier 140 may be trained using training data correlating digital resource data to categories of gravity components. Additionally, or alternatively, the determining a gravity component for the at least one common digital resource may comprise classifying, by the at least a processor, the digital resource data to at least one gravity component using the gravity component classifier 140 and outputting, by the at least a processor, the at least one least one gravity component.

Still referring to FIG. 1, processor 104 is configured to identify a single point of failure 144 based on the at least one common digital resource. As used in this disclosure, a "single point of failure" is a point of failure that may cause failure of an entire digital resource, computing environment, and/or multiple computing environments. For example, if all operations in an enterprise layer take place on a single computing device, the single computing device may be a single point of failure. Likewise, if a computing environment and/or organization cannot function without a specific application, that application may be a single point of failure; if the application is compromised, nothing will function until it is replaced or restored. Likewise, a given data record and/or database storing data may be a single point of failure where an application, environment, or organization is unable to function without it; thus, if that given data record and/or database storing data is encrypted in a ransomware attack, is corrupted, or the like, it may cause an application, environment, or organization-wide outage, loss of work, or the like. In a non-limiting embodiment, single point of failure 144 may include any digital resource, for example a database, hardware component, security protocol, and the like. In an exemplary embodiment, processor 104 may be configured to select the single point of failure 144 from the at least one common digital resource. Additionally, or alternatively, single point of failure 144 may include single point of failure data. The single point of failure data may include degree of single points of failure data and impact of failure data. As used in this disclosure, "degree of single points of failure data" is data indicating a level of failure associated with each digital resources in the event of a cyber-attack and/or failed operation of the digital asset. Further, "impact of failure data," as used in this disclosure, is data describing a level of failure of a computing environment based on different potential cyber-attacks and different potential points of failure in digital resources. Further, for instance, and without limitation, degree of single points of failure data and impact of failure data may be consistent with degree of single points of failure data and impact of failure data in U.S. patent application Ser. No. 17/963,805, filed on Oct. 11, 2022, and entitled, "APPARATUS AND METHOD FOR DETERMINING A RISK ASSOCIATED WITH A CYBER-ATTACK," which is incorporated by reference herein in its entirety.

Continuing to refer to FIG. 1, identifying a single point of failure 144 based on the at least one common digital resource may include identifying the single point of failure 144 from the at least one common digital resource based on the gravity component. For example, processor 104 may be configured to identify the at least one common digital resource with the highest gravity component as the single point of failure 144. Additionally, or alternatively, processor 104 may be configured to generate a ranked list of at least one common digital resource based on the gravity component. Further, processor 104 may be configured to select the single point of failure 144 based on the ranked list of at least one common digital resource. For example, processor 104 may be configured to select a resource with the highest gravity component as the at least one critical resource. Further, processor 104 may be configured to select a threshold percentage of the ranked list of each gravity component. In a non-limiting example, processor 104 may be configured to select a top 10%, 5%, 1%, and the like, of digital resources on the ranked list of gravity components as the single point of failure. Additionally, or alternatively, processor 104 may be configured to compare each gravity component to a threshold score, and select the digital resources with gravity components greater than the threshold score as the single point of failure.

Still referring to FIG. 1, identifying a single point of failure based on the at least one common digital resource may include identifying the single point of failure from the at least one common digital resource using a machine learning model, such as a single point of failure machine learning model. Single point of failure machine learning model may be trained by training data, discussed in further detail below, such as single point of failure training data. Single point of failure training data may be stored in database 128.

With continued reference to FIG. 1, identifying the single point of failure from the at least one common digital resource using a machine learning model may include receiving single point of failure training data. In an embodiment, single point of failure training data may include common digital resource data 124 that are each correlated to one of a plurality of single point of failure data. For example, single point of failure training data may be used to show common digital resource data may indicate a particular single point of failure. In a further embodiment, single point of failure training data may also include a plurality of common digital resource data that are each correlated to one of a plurality of single point of failure data. In such an embodiment, single point of failure training data may be used show how different common digital resources data may indicate a particular single point of failure. Identifying the single point of failure from the at least one common digital resource using a machine learning model may further include training a single point of failure machine learning model as a function of single point of failure training data. Further, identifying the single point of failure from the at least one common digital resource using a machine learning model may also include determining the single point of failure using trained single point of failure machine learning model.

Figure 2:
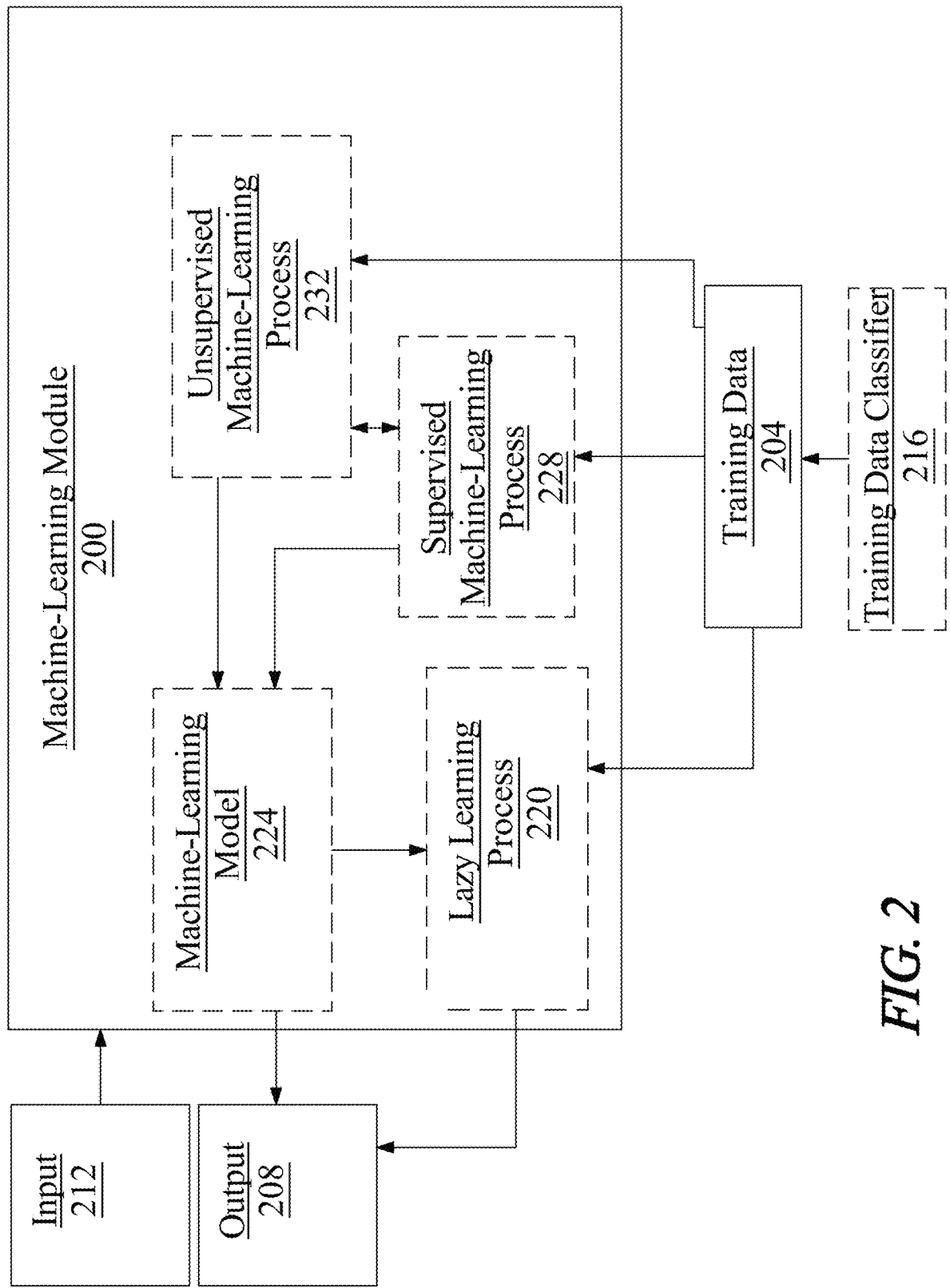
FIG. 2 is an exemplary embodiment of a machine-learning module.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, a user profile may be an input and a predictive quantifier may be an output.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a process whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to categories of total cryptographic capital return for which a subset of training data may be selected.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors' algorithm, a lazy naive Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include any input as described above as inputs, any output as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
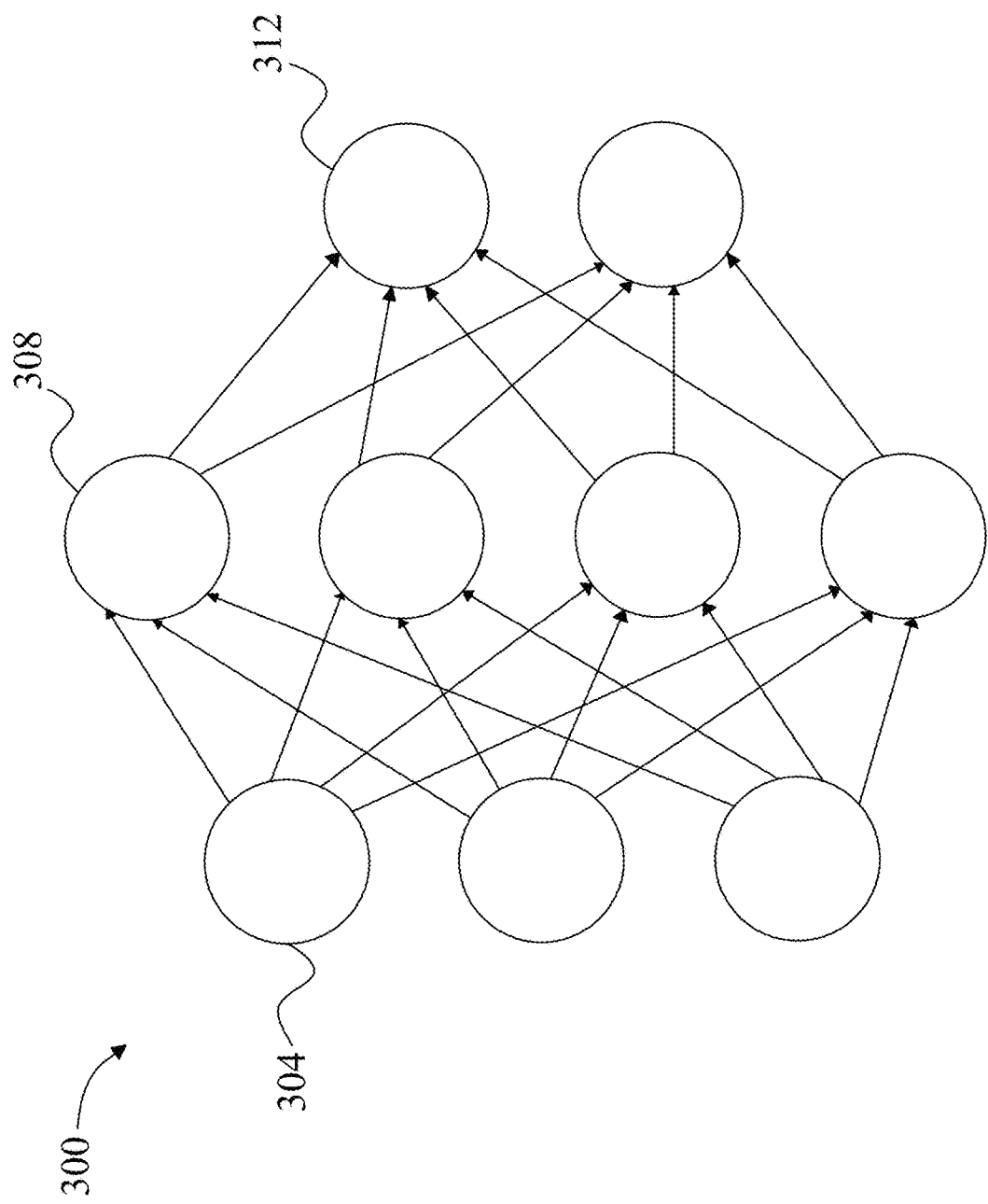
FIG. 3 is a diagram of an exemplary nodal network in accordance with one or more embodiments of the present disclosure.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training"

the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 4:
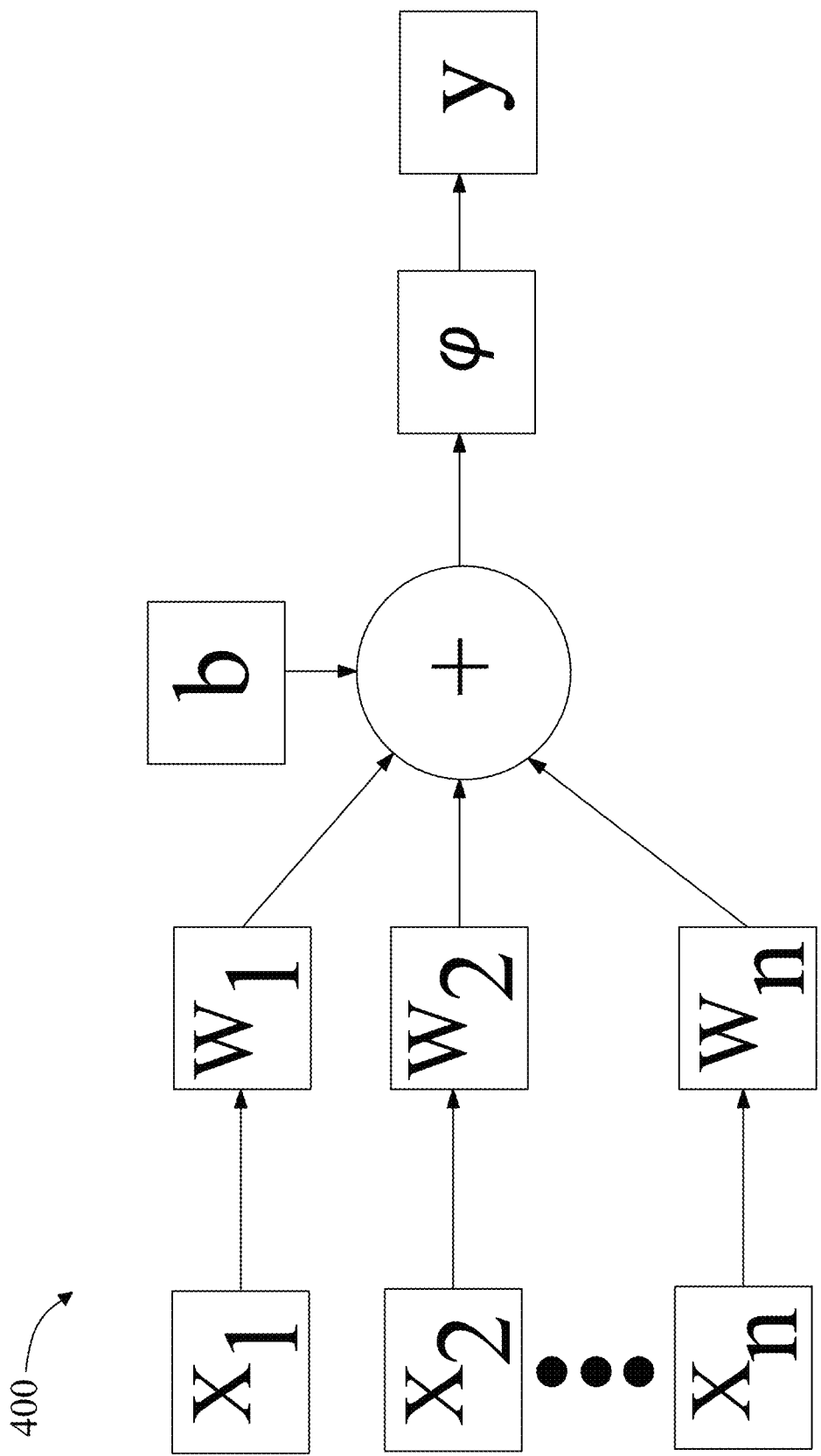
FIG. 4 is a block diagram of an exemplary node in accordance with one or more embodiments of the present disclosure.

Referring now to FIG. 4, an exemplary embodiment of a node of a neural network is illustrated. A node may include, without limitation a plurality of inputs x; that may receive numerical values from inputs to a neural network containing the node and/or from other nodes. Node may perform a weighted sum of inputs using weights w, that are multiplied by respective inputs xi. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight w, applied to an input x; may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights w, may be determined by training a neural network using training data, which may be performed using any suitable process as described above.

Figure 5:
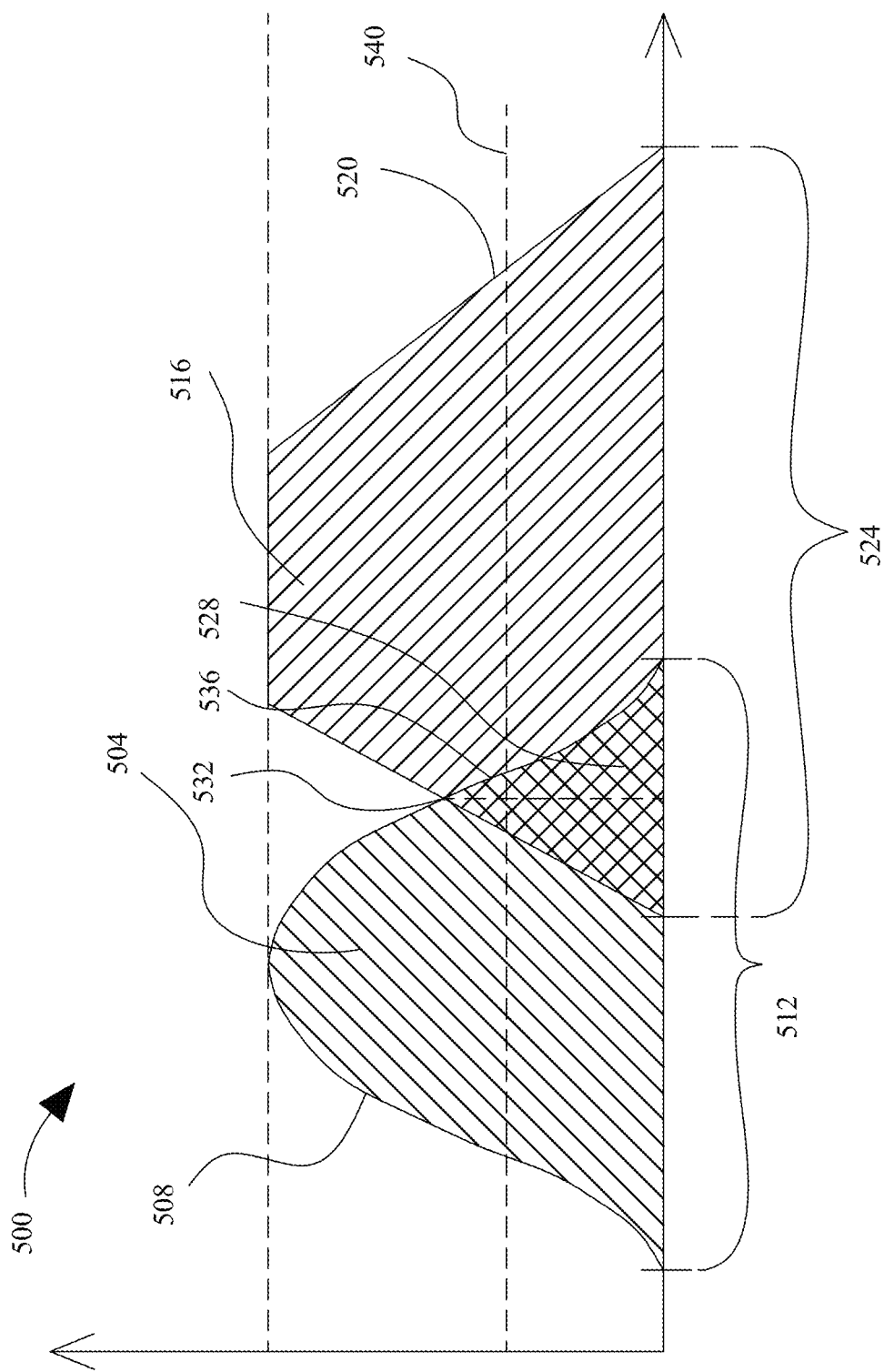
FIG. 5 is a schematic diagram illustrating an exemplary embodiment of a fuzzy inferencing system.

Referring to FIG. 5, an exemplary embodiment of fuzzy set comparison 500 is illustrated. A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y = (x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine-learning models. A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 562 representing a probability, as defined on probability interval, of a match between first fuzzy set 504 and second fuzzy set 516. Alternatively, or additionally, a single value of first and/or second fuzzy set may be located at a locus 566 on first range 512 and/or second range 524, where a probability of membership may be taken by evaluation of first membership function 508 and/or second membership function 520 at that range point. A probability at 528 and/or 562 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models, for combination to occur as described above. Alternatively, or additionally, each threshold may be tuned by a machine-learning and/or statistical process, for instance and without limitation as described in further detail below.

Further referring to FIG. 5, in an embodiment, a degree of match between fuzzy sets may be used to classify the at least one common digital resource data with at least one corresponding gravity component. For example, if common digital resource data has a fuzzy set matching a first gravity component fuzzy set by having a degree of overlap exceeding a threshold, processor 104 may determine first gravity component as the gravity component. Where multiple fuzzy matches are performed, degrees of match for each respective fuzzy set may be computed and aggregated through, for instance, addition, averaging, or the like, to determine an overall degree of match.

Still referring to FIG. 5, in an embodiment, common digital resource data may be compared to multiple gravity component fuzzy sets. For instance, common digital resource data, as described above, may be represented by a fuzzy set that is compared to each of the multiple gravity component fuzzy sets; and a degree of overlap exceeding a threshold between the common digital resource data fuzzy set and any of the multiple gravity components fuzzy sets may cause processor 104 to identify each of the gravity components as a gravity component. For instance, in one embodiment there may be gravity component fuzzy sets, representing respectively a first gravity component and a second gravity component. A first gravity component may have a first fuzzy set; second gravity component may have a second fuzzy set; and common digital resource data may have a common digital resource data fuzzy set. Processor 104, for example, may compare common digital resource data fuzzy set with each of first gravity component fuzzy set and second gravity component fuzzy set, as described above, and identify either, both, or neither of first and second gravity components as the gravity components. Machine-learning methods as described throughout may, in a non-limiting example, generate coefficients used in fuzzy set equations as described above, such as without limitation x, c, and a of a Gaussian set as described above, as outputs of machine-learning methods.

Still referring to FIG. 5, a computing device may use a logic comparison program, such as, but not limited to, a fuzzy logic model to determine a compatibility score. A compatibility score may include, but is not limited to, high compatibility, mid compatibility, low compatibility, and the like; each such score may be represented as a value for a linguistic variable representing score, or in other words a fuzzy set as described above that corresponds to a degree of match of gravity component as calculated using any statistical, machine-learning, or other method that may occur to a person skilled in the art upon reviewing the entirety of this disclosure. In other words, a given element of common digital resource data may have a first non-zero value for membership in a first linguistic variable value such as a first gravity component and a second non-zero value for membership in a second linguistic variable value such as a second gravity component. In some embodiments, determining a gravity component may include using a linear regression model. A linear regression model may include a machine learning model. A linear regression model may be configured to map data of user to one or more gravity components. A linear regression model may be trained using training data as discussed above. In some embodiments, determining the gravity component may include using a gravity component classification model. A gravity component classification model may be configured to input collected data and cluster data to a centroid based on, but not limited to, frequency of appearance, and the like. Centroids may include compatibility scores assigned to them such that each user data may each be assigned a compatibility score. In some embodiments, a gravity component classification model may include a K-means clustering model. In some embodiments, a gravity component classification model may include a particle swarm optimization model. In some embodiments, determining a compatibility score of common digital resource data may include using a fuzzy inference engine. A fuzzy inference engine may be configured to map one or more data elements using fuzzy logic. In some embodiments, a plurality of gravity components may be arranged by a logic comparison program into compatibility score arrangements. A "compatibility score arrangement" as used in this disclosure is any grouping of objects and/or data based on degree of match for gravity component. This step may be implemented as described above. Membership function coefficients and/or constants as described above may be tuned according to classification and/or clustering algorithms. For instance, and without limitation, a clustering algorithm may determine a Gaussian or other distribution of questions about a centroid corresponding to a given level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 5, an inference engine may be implemented according to input and/or output membership functions and/or linguistic variables. Continuing the example, an output linguistic variable may represent, without limitation, a third gravity component. An inference engine may combine rules, such as: "if the common digital resource data for first digital resource is 'high' and the common digital resource data for second digital resource is 'low', the gravity component of first digital resource is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T (T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

Figure 6:
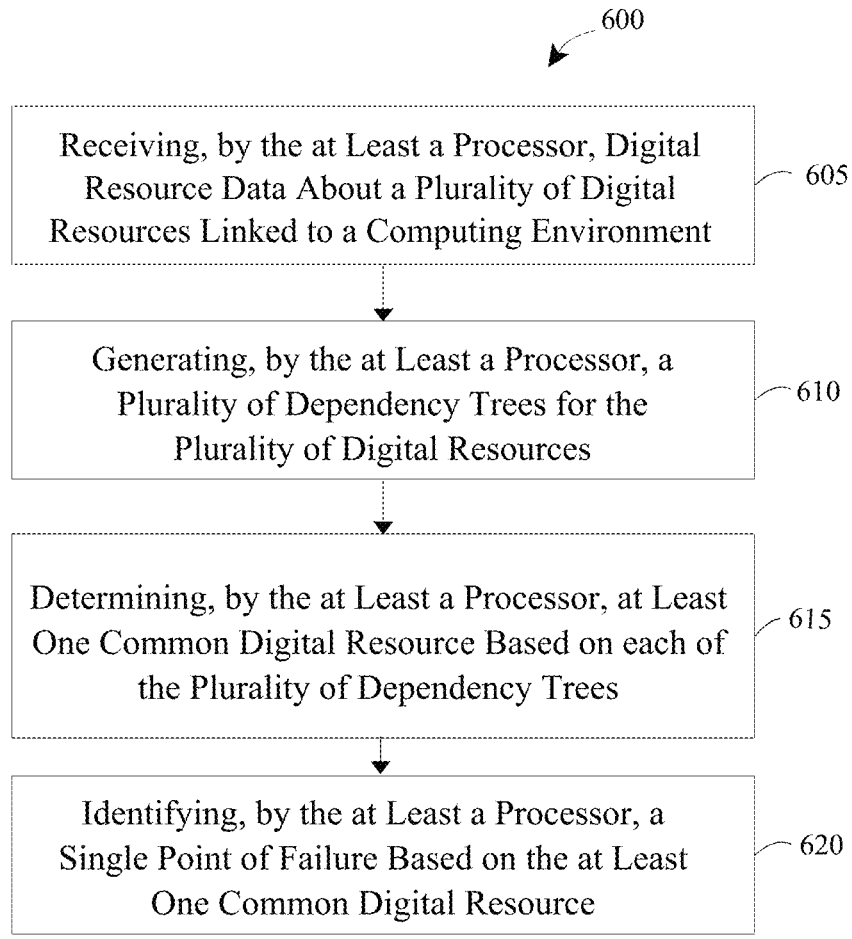
FIG. 6 is a flow diagram illustrating a method for identifying single points of failure in accordance with one or more embodiments of the present disclosure.

Referring now to FIG. 6, a flow diagram of an exemplary method 600 for identifying single points of failure is illustrated. At step 605, method 600 includes receiving, by at least a processor, digital resource data for a plurality of digital resources linked to a computing environment. In an embodiment, the digital resource data may comprise product level data. Additionally, or alternatively, the digital resource data may comprise component level data. In an embodiment, method 600 may include determining, by the at least a processor, product version data as a function of the product level data and identifying, by the at least a processor, a product version of each of the plurality of digital resources. Further, method 600 may include determining, by the at least a processor, component version data as a function of the component level data and identifying, by the at least a processor, a component version of each component of the plurality of digital resources. These may be implemented as described and with reference to FIGS. 1-5.

Still referring to FIG. 6, at step 610, method 600 includes generating, by the at least a processor, a plurality of dependency trees for the plurality of digital resources. This may be implemented as described and with reference to FIGS. 1-5.

Continuing to reference FIG. 6, at step 615, method 600 includes determining, by the at least a processor, at least one common digital resource from each of the plurality of dependency trees. Additionally, or alternatively, determining at least one common digital resource from each of the plurality of dependency trees may comprise determining at least one common version of digital resource based on the product version data. Further, in an embodiment, determining at least one common digital resource from each of the plurality of dependency trees may comprise determining, by the at least a processor, at least one common version of digital resource based on the component version data. Additionally, or alternatively, determining at least one common digital resource from each of the plurality of dependency trees may comprise determining, by the at least a processor, a gravity component for the at least one common digital resource. These may be implemented as described and with reference to FIGS. 1-5.

Still referring to FIG. 6, at step 620, method 600 includes identifying, by the at least a processor, a single point of failure from the at least one common digital resource. Additionally, or alternatively, identifying a single point of failure from the at least one common digital resource may include identifying, by the at least a processor, the single point of failure from the at least one common digital resource based on the gravity component. In an exemplary embodiment, identifying a single point of failure from the at least one common digital resource comprises identifying, by the at least a processor, a single point of failure from the at least one common digital resource using a machine learning model. These may be implemented as described and with reference to FIGS. 1-5.

Still referring to FIG. 6, processor and/or computing device containing processor may perform, and/or may be configured to perform, one or more steps to identify and/or recommend to a user remedies for discovered single points of failure, including without limitation as described in U.S. Nonprovisional application Ser. No. 17/963,833, filed on Oct. 11, 2022 and entitled "APPARATUS AND METHOD FOR DETERMINING A RECOMMENDED CYBER-ATTACK RISK REMEDIATION ACTION," the entirety of which is incorporated herein by reference. Processor and/or computing device containing processor may perform, and/or may be configured to perform, one or more steps to remedy and/or repair single points of failure, including without limitation as described in U.S. Nonprovisional application Ser. No. 17/963,855, filed on Oct. 11, 2022, and entitled "APPARATUS AND METHOD FOR IMPLEMENTING A RECOMMENDED CYBER-ATTACK SECURITY ACTION," the entirety of which is incorporated herein by reference.

With further reference to FIG. 1, the processor 104 is further configured to determine at least one recommended risk remediation action. As used in this disclosure, a "recommended risk remediation action" is an action to be performed in the digital environment to address areas with reduced security within the digital environment to reduce vulnerability to a cyber-attack. The vulnerability to cyber-attack may be related to an aspect of the cyber profile and/or the risk profile for digital environment 116. For example, the at least one recommended risk remediation action may include adding digital assets to the digital environment, changes to existing digital assets, changes to user settings and access to digital assets, changes to network protective asset, but are not limited thereto. The determining of the at least one recommended risk remediation action may include using the processor 104 to analyze the cyber profile and risk profile and identify at least one area of vulnerability in the digital environment 116 based on at least the analysis of the cyber profile and the risk profile, and the at least one recommended risk remediation action may be determined based on the at least one area of vulnerability in the digital environment 116. In an embodiment, the at least one recommended risk remediation action may include a comprehensive list of all actions that may need to be implemented for the digital environment 116, a portion of the comprehensive list, and the like. For example, the list of vulnerabilities may be a recommended action for a digital asset may be susceptible to a cyber-attack compared to other digital assets, and the like. For example, the at least one recommended risk remediation action may be updating to a newer version of an operating system in a digital asset with increased security measures. The at least one recommended risk remediation action may be stored in database 128 to maintain a history and/or a checklist of at least one recommended risk remediation action to ensure implementation of the at least one recommended risk remediation action. Database 128 is discussed in further detail above.

With continued reference to FIG. 1, the processor 104 may be configured to determine the at least one recommended risk remediation action based on the risk profile. In an exemplary embodiment, the processor 104 may be configured to use at least one of the cyber-attack protection data, degree of single points of failure data, and cyber-attack recovery protocol data to identify an area of vulnerability to cyber-attack within the cyber-attack protection data, degree of single points of failure data, and cyber-attack recovery protocol data and determine the at least one recommended risk remediation action. For example, the processor 104 may be configured to identify potential issues for digital environment 116 associated with each of the cyber-attack protection data, degree of single points of failure data, and/or cyber-attack recovery protocol data with a risk level for cyber-attack and determine the at least one recommended risk remediation action that can be used to address the potential issues. In an embodiment, the at least one recommended risk remediation action may also include any of the cyber profile category risk remediation actions and/or risk profile category risk remediation actions described herein, or any combination thereof. Further, the processor 104 may be configured to adjust the at least one recommended risk remediation action based on additional risk profile data. Additionally, or alternatively, the processor 104 may be configured to determine the at least one recommended risk remediation action based on the cyber profile. In an exemplary embodiment, the processor 104 may be configured to use at least one of the digital profile data about the digital assets, user data associated with the digital assets, protective asset data, cyber-attack protection data, degree of single points of failure data, and cyber-attack recovery protocol data to determine the at least one recommended risk remediation action. For example, the processor 104 may be configured to associate each of the digital assets, protective asset data, cyber-attack protection data, cyber-attack protection data, degree of single points of failure data, and cyber-attack recovery protocol data with a risk level for cyber-attack and determine the at least one recommended risk remediation action based on the associated risk levels. Further, the processor 104 may be configured to adjust the at least one recommended risk remediation action based on additional risk profile data and cyber profile data.

Continuing to refer to FIG. 1, the processor 104 may also be configured to determine a risk profile category risk remediation action for each category of the risk profile data using a risk remediation action machine learning model. As used in this disclosure, "risk profile category risk remediation action" is a recommended action for preventing and resolving issues associated with a cyber-attack associated with a specific category of risk profile data. In an embodiment, the processor 104 may be configured to determine a risk profile category risk remediation action for each category of the risk profile in addition to each of the cyber profile risk remediation actions described above. Further, the processor 104 may be configured to determine cyber profile category risk remediation actions and/or risk profile category risk remediation actions for any subset of categories for the cyber profile and risk profile. As discussed above, categories of risk profile data may include cyber-attack protection data, degree of single points of failure data, cyber-attack recovery protocol data, digital environment risk record, and the like. According to an embodiment, each risk profile risk remediation action may be a part of the digital risk environment remediation action 128 and may be any risk remediation action as described herein. In an embodiment, the categories of the risk profile data may be cyber-attack protection data, degree of single points of failure data, and cyber-attack recovery protocol data, as described above, and the processor 104 may be configured to determine a risk profile risk remediation action for the cyber-attack protection data, degree of single points of failure data, and cyber-attack recovery protocol data using the risk remediation action machine learning model 140. However, the processor may be configured to determine a risk profile risk remediation action for any category of data associated with the risk profile data. In an exemplary embodiment, for cyber-attack protection data, the processor 104 may receive data indicating a lower level of protection (e.g., lower firewall settings, greater user access, and the like) and determine a risk profile risk remediation action of increasing the firewall settings, decreasing user access, and the like. In a further exemplary embodiment, the processor 104 may receive data indicating a greater single point of failure (e.g., a larger portion of digital environment would lose functionality) and determine a risk profile risk remediation action of changing a network architecture to reduce an effect on the digital environment during an interruption of operation. In another further exemplary embodiment, the processor 104 may receive data indicating implementation of lower levels of cyber-attack recovery protocols (e.g., data is not backed up and cannot be recovered quickly, and the like) and determine a risk profile risk remediation action of creating back up files and/or implement quicker methods of data recovery.

With continued reference to FIG. 1, the processor 104 may be configured to receive risk profile remediation action training data that correlates a plurality of risk profile data to each of a plurality of risk profile risk remediation actions, train the risk remediation action machine learning model as a function of the risk profile risk remediation action training data, and determine a risk profile risk remediation action for each category of the risk profile data using the trained risk remediation action machine learning model. In an embodiment, the risk remediation action machine learning model may be trained using risk profile risk remediation action training data to determine a relationship between an input of a plurality of risk profile data to calculate an output of risk profile risk remediation action.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
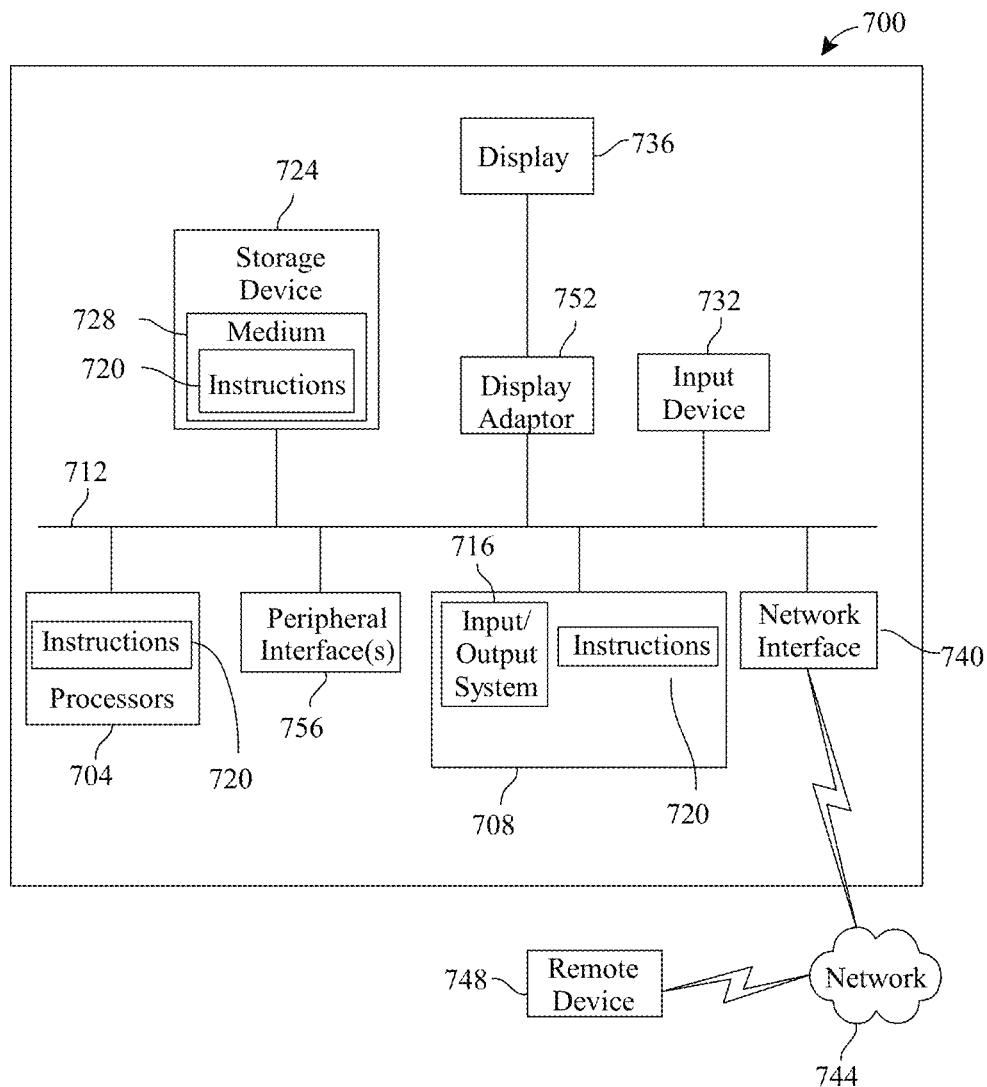
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve apparatuses and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for identifying single points of failure, the apparatus comprising:
   at least a processor; and
   a memory communicatively coupled to the at least a processor, the memory containing instructions configuring the at least a processor to:
   receive digital resource data for a plurality of digital resources linked to at least a computing environment;
   generate a plurality of dependency trees for the plurality of digital resources;
   determine at least one common digital resource based on the plurality of dependency trees, wherein determining the at least one common digital resource based on the plurality of dependency trees comprises determining a gravity component for the at least one common digital resource, wherein determining the gravity component for the at least one common digital resource comprises:
   generating, by the at least a processor, a gravity component classifier;
   receiving, by the at least a processor, gravity component training data comprising a plurality of dependency tree data correlated to a plurality of gravity component data;
   training the gravity component classifier as a function of the gravity component training data; and
   determining the gravity component as a function of the trained gravity component classifier;
   identify a single point of failure based on the at least one common digital resource, wherein identifying the single point of failure further comprises:
   training a machine learning model using training data, wherein the training data comprises a plurality of common digital resource data correlated to a plurality of single point of failure data; and
   identifying the single point of failure as a function of the at least one common digital resource using the trained machine learning model, wherein the at least one common digital resource is input to the trained machine learning model to output the single point of failure;
   recommend a risk remediation action based on the identified single point of failure; and
   implement the risk remediation action, wherein the risk remediation action comprises changing a network architecture to reduce an effect of the identified single point of failure on the computing environment.

2. The apparatus of claim 1, wherein the digital resource data comprises product level data associated with the plurality of digital resources.

3. The apparatus of claim 2, wherein the memory contains instructions further configuring the processor to:
   determine product version data as a function of the product level data; and
   identify a product version of each of the plurality of digital resources.

4. The apparatus of claim 3, wherein determining the at least one common digital resource based on each of the plurality of dependency trees comprises determining at least one common version of the at least one common digital resource based on the product version data.

5. The apparatus of claim 1, wherein the digital resource data comprises component level data associated with the plurality of digital resources and the at least a processor is configured to:
   determine component version data as a function of the component level data; and
   identify a component version of a component of the at least one common digital resource.

6. The apparatus of claim 5, wherein determining the at least one common digital resource based on each of the plurality of dependency trees comprises determining at least one common version of digital resource based on the component version data.

7. The apparatus of claim 1, wherein determining the at least one common digital resource based on each of the plurality of dependency trees comprises determining, using a fuzzy set comparison, the gravity component for the at least one common digital resource by matching a common digital resource fuzzy set to a gravity component fuzzy set.

8. The apparatus of claim 7, wherein identifying the single point of failure based on the at least one common digital resource comprises identifying the single point of failure based on the at least one common digital resource based on the gravity component.

9. The apparatus of claim 1, wherein:
   the machine learning model comprises a neural network including an input layer of nodes, at least an intermediate layer of nodes and an output layer of nodes; and
   training the neural network comprises applying elements from the training data to the input layer of nodes and using a training algorithm to adjust connections and weights between nodes in adjacent layers of the neural network to produce output values at the output layer of nodes.

10. A method for identifying single points of failure, the method comprising:
    receiving, by at least a processor, digital resource data for a plurality of digital resources linked to a computing environment;
    generating, by the at least a processor, a plurality of dependency trees for the plurality of digital resources;
    determining, by the at least a processor, at least one common digital resource based on each of the plurality of dependency trees, wherein determining the at least one common digital resource based on the plurality of dependency trees comprises determining a gravity component for the at least one common digital resource, wherein determining the gravity component for the at least one common digital resource comprises:
  generating, by the at least a processor, a gravity component classifier;
  receiving, by the at least a processor, gravity component training data comprising a plurality of dependency tree data correlated to a plurality of gravity component data;
  training the gravity component classifier as a function of the gravity component training data; and
  determining the gravity component as a function of the trained gravity component classifier;
identifying, by the at least a processor, a single point of failure based on the at least one common digital resource, wherein identifying the single point of failure further comprises:
  training a machine learning model using training data, wherein the training data comprises a plurality of common digital resource data correlated to a plurality of single point of failure data; and
  identifying the single point of failure as a function of the at least one common digital resource using the trained machine learning model, wherein the at least one common digital resource is input to the trained machine learning model to output the single point of failure;
recommending, by the at least a processor, a risk remediation action based on the identified single point of failure; and
implementing, by the at least a processor, the risk remediation action, wherein the risk remediation action comprises changing a network architecture to reduce an effect of the identified single point of failure on the computing environment.

11. The method of claim 10, wherein the digital resource data comprises product level data.

12. The method of claim 11, wherein the method further comprises:
  determining, by the at least a processor, product version data as a function of the product level data; and
  identifying, by the at least a processor, a product version of each of the plurality of digital resources.

13. The method of claim 12, wherein determining the at least one common digital resource based on each of the plurality of dependency trees comprises determining at least one common version of the at least one common digital resource based on the product version data.

14. The method of claim 10, wherein the digital resource data comprises component level data and the method further comprises:
  determining, by the at least a processor, component version data as a function of the component level data; and
  identifying, by the at least a processor, a component version of a component of the at least one common digital resource.

15. The method of claim 14, wherein determining the at least one common digital resource based on each of the plurality of dependency trees comprises determining, by the at least a processor, at least one common version of digital resource based on the component version data.

16. The method of claim 10, wherein determining the at least one common digital resource based on each of the plurality of dependency trees comprises determining, by the at least a processor using a fuzzy set comparison, the gravity component for the at least one common digital resource by matching a common digital resource fuzzy set to a gravity component fuzzy set.

17. The method of claim 16, wherein identifying the single point of failure based on the at least one common digital resource comprises identifying, by the at least a processor, the single point of failure based on the at least one common digital resource based on the gravity component.

18. The method of claim 10, wherein:
  the machine learning model comprises a neural network including an input layer of nodes, at least an intermediate layer of nodes and an output layer of nodes; and
  training the neural network comprises applying elements from the training data to the input layer of nodes and using a training algorithm to adjust connections and weights between nodes in adjacent layers of the neural network to produce output values at the output layer of nodes.

* * * * *